(12) United States Patent
Chen et al.

(10) Patent No.: US 12,508,975 B2
(45) Date of Patent: Dec. 30, 2025

(54) SAFETY TENSIONING DEVICE FOR AUTOMOBILES

(71) Applicant: Ningbo Xuli Metal Products Co., Ltd., Zhejiang (CN)

(72) Inventors: Weiguo Chen, Ningbo (CN); Yanqiong Chen, Ningbo (CN); Kefeng Jin, Ningbo (CN); Wei Deng, Ningbo (CN)

(73) Assignee: Ningbo Xuli Metal Products Co., Ltd., Ningbo (CN)

( * ) Notice: Subject to any disclaimer, the term of this patent is extended or adjusted under 35 U.S.C. 154(b) by 175 days.

(21) Appl. No.: 18/417,208

(22) Filed: Jan. 19, 2024

(65) Prior Publication Data

US 2024/0409022 A1 Dec. 12, 2024

(51) Int. Cl.
*B60P 7/00* (2006.01)
*B60P 7/08* (2006.01)

(52) U.S. Cl.
CPC .................... *B60P 7/083* (2013.01)

(58) Field of Classification Search
CPC ............... B60P 7/083; B60P 7/06; B66D 3/02
See application file for complete search history.

(56) References Cited

U.S. PATENT DOCUMENTS

| | | | | |
|---|---|---|---|---|
| 2,586,048 A * | 2/1952 | Hyatt | ....................... | B60P 7/083 254/DIG. 14 |
| 7,350,767 B2 * | 4/2008 | Huang | ..................... | B60P 7/083 254/218 |
| 7,789,603 B2 * | 9/2010 | Huck | ....................... | B60P 7/083 410/100 |
| 8,312,601 B2 * | 11/2012 | Huang | ..................... | B60P 7/083 254/218 |
| 10,065,554 B1 * | 9/2018 | Xia | .......................... | B60P 7/083 |
| 10,227,030 B2 * | 3/2019 | Kingery | .................. | B60P 7/083 |
| 11,987,163 B2 * | 5/2024 | Zhou | ................... | B65H 75/4444 |
| 2013/0247340 A1 * | 9/2013 | Chen | .......................... | B62J 7/08 24/69 ST |
| 2014/0246533 A1 * | 9/2014 | Huang | .................. | B60P 7/0846 242/379 |

(Continued)

FOREIGN PATENT DOCUMENTS

| | | | | |
|---|---|---|---|---|
| CN | 105235933 A | * | 1/2016 | ............. B65B 13/22 |
| DE | 202011050983 U1 | * | 11/2011 | .............. B60P 7/083 |

(Continued)

*Primary Examiner* — Emmanuel M Marcelo
(74) *Attorney, Agent, or Firm* — Wang Law Firm, Inc.

(57) ABSTRACT

A safety tensioning device for automobile comprises a winding assembly disposed on the base and driven by a main shaft, the winding assembly and a coil spring; a stop plate and a pressing plate disposed respectively at the front end and the rear end of the base; a driving pawl is rotatably connected to the handle. The handle is pivoted to the base and is capable of rotating about the main shaft; the base has three operating regions on the top of the base: a tensioning region, a working region and a release region, the three operating regions cooperate with the limiting block of the driving pawl. The present invention can automatically wind the first bundling strap when the first bundling strap is loose due to jolts in the operating state, so that the first bundling strap is always kept in the tensioned state, thereby preventing unhooking and greatly improving the use safety.

11 Claims, 17 Drawing Sheets

(56) References Cited

U.S. PATENT DOCUMENTS

2019/0210511 A1\* 7/2019 Kingery .................. B60P 7/083
2021/0170937 A1\* 6/2021 Chen ....................... B60P 7/083

FOREIGN PATENT DOCUMENTS

DE  202019102243 U1 \*  4/2019  .............. B60P 7/083
EP        0455085 A1 \* 11/1991  .............. B60P 7/083
EP        0504557 A1 \*  9/1992  .............. F16G 11/12

\* cited by examiner

SAFETY TENSIONING DEVICE FOR AUTOMOBILES

TECHNICAL FIELD OF THE INVENTION

The present invention relates to a safety tensioning device for automobiles which is used for fixing and fastening cargos on vehicles such as automobiles, trailers, airplanes and ships.

BACKGROUND OF THE INVENTION

The safety tensioning device for automobiles usually consists of a tensioning device body, a long bundling strap, a short bundling strap or the like. The bundling straps are generally woven straps with or without hooks. The device body employs an anti-reverse rotation ratchet mechanism. A driving pawl is driven directly by a handle, the driving pawl pushes a ratchet wheel, and the ratchet wheel directly drives a main shaft, so that a bundling strap wound onto the main shaft is tensioned. A stop plate prevents the ratchet wheel from reverse rotation, so that certain tension can be maintained on the bundling strap and the cargo can be tied up and fixed. The length of a working area of the device will be different according to different application scenarios, so the excessive bundling straps will always fly outside the device, resulting in potential safety hazards; and, the bundling strap is very messy after use, thus affecting the latter use.

Products for automatically winding the bundling strap are available in a market. For example, a Chinese patent CN100391645C (patent No.: CN200610050653.6) titled "An Automatic Strap Winding and Tensioning Device" was found. A reel using a ratchet wheel can automatically wind the bundling strap by using a volute spiral spring. Although this method can solve the above problem, some other problems still existed. For example, since many circles of first bundling strap wind on the reel, due to jolts and vibration of the automobile under stress during use, the first bundling strap tightly wound on the reel will be pulled out slowly, so that the tension on the first bundling strap is gradually reduced. A slippage of the cargo caused by the jolts may lead to the loose first bundling strap or even the unhooking of the hook, so that the cargo is unbundled to cause safety accidents.

In addition, after use, the first bundling strap should be able to be automatically wound into the reel. However, after long-term use, the volute spiral spring that produces the driving force will have the attenuation of elasticity or even break and lose its elasticity, so that the first bundling strap cannot be completely wound or automatically wound.

In summary, it is necessary to further improve the existing safety tensioning devices for automobiles.

SUMMARY OF THE INVENTION

It is a first object of the present invention to provide a safety tensioning device for automobiles which can automatically wind a first bundling strap when the first bundling strap is loose during use, so that the first bundling strap of the tensioning device in an operating state can always keep tensioned, thus preventing unhooking and improving safety.

It is a second object of the present invention to provide a safety tensioning device for automobiles which can still completely wind a first bundling strap into a reel after the elasticity of a volute spiral spring is attenuated or disabled.

For achieving the first object, the safety tensioning device for automobiles comprises a base having a front end, a rear end, a top and a bottom; a handle; a first bundling strap having a first bundling strap and a hook; a winding assembly disposed on the base and driven by a main shaft, the winding assembly having a reel for winding the first bundling strap using a ratchet wheel and a coil spring; a stop plate and a pressing plate disposed respectively at the front end and the rear end of the base; a driving pawl having one or more limiting blocks is rotatably connected to the handle; wherein, the handle is pivoted to the base and is capable of rotating about the main shaft, the rotation of the handle changes an acting state of the stop plate and the pressing plate to the ratchet wheel; the base has three operating regions on the top of the base: a tensioning region, a working region and a release region, the three operating regions cooperate with the limiting block of the driving pawl; when the limiting block of the driving pawl is restricted to the working region, both the driving pawl and the pressing plate are separated from the ratchet wheel, the stop plate is engaged with the ratchet wheel, and, a moment $M1$ produced by the stop plate on the reel is less than a moment $M2$ produced by the coil spring on the main shaft, that is, $M1<M2$, so as to tension the loose first bundling strap on the reel by the coil spring.

Thus, in an operating state, when the first bundling strap is loose, for example, at a moment of jolts, the ratchet wheel can rotate counterclockwise under the action of the coil spring so as to push the stop plate. After passing across one or more teeth, the stop plate engages a rood of the racket wheel again.

In the tensioning device with the above structure, preferably, the handle has a first bump and a second bump on a bottom of the handle for respectively pushing the stop plate and the pressing plate, the handle can push the stop plate and the pressing plate during rotation of the handle, so as to engage or disengage the stop plate with the ratchet wheel, and attach or separate the pressing plate from the ratchet wheel, to change the acting state of the stop plate and the pressing plate to the ratchet wheel.

Preferably, the driving pawl has a push block at a rear end of the driving pawl for pushing the pressing plate to rotate and separate from the ratchet wheel. Conventionally, the stop plate functions to prevent the ratchet wheel from reverse rotation, and the pressing plate functions to control a rotation speed of the ratchet wheel, wherein the forward rotation of the ratchet wheel (a counterclockwise direction shown in the figures) means the first bundling strap is in a tensioned state, while the reverse rotation of the ratchet wheel (a clockwise direction shown in the figures) means the first bundling strap is in a release state.

In the tensioning device with the above structure, preferably, the base has a plurality of protrusions on the top of a side of the base to separate the tensioning region, working region and release region, the tensioning region, the working region and the release region are distributed sequentially from front to rear of the base. When the limiting blocks on the driving pawl are restricted in the tensioning region, both the driving pawl and the stop plate engage the ratchet wheel, so that a tensioning operation can be realized by operating the handle, that is, the ratchet wheel can be rotated to wind and tension the first bundling strap so as to produce the tension force.

Preferably, when the limiting block of the driving pawl is restricted to the release region, both the driving pawl and the stop plate are separated from the ratchet wheel, the pressing plate is attached to the ratchet wheel, and, a moment $M3$ produced by the pressing plate on the reel is greater than the moment $M2$ produced by the coil spring on the main shaft, that is, M3>M2, so as to prevent the reel from rotating freely. After a button is pressed down to push the pressing plate through the push block, the ratchet wheel can rotate freely to wind the first bundling strap.

In the tensioning device with the above structure, preferably, a housing covers the front end of the base, a notch and a barb which can be buckled with each other are arranged on the housing and the base, respectively, and, the housing has a groove for receiving the hook of the first bundling strap in a front side of the housing to play a buffer role when the hook is quickly retracted.

Preferably, the base has a connecting hole, and the base can be fixed at a corresponding position of the automobile or cargo through a connecting member (e.g., a bolt, a rivet, etc.), so that a second bundling strap is not needed.

For achieving the second object, preferably, a hand wheel assembly capable of manually winding the first bundling strap is connected to the main shaft opposite the coil spring, and the hand wheel assembly comprises a hand wheel capable of driving the main shaft to rotate. The hand wheel directly drives the main shaft to rotate and also drives the reel to rotate to wind the first bundling strap, so that complementary winding can be realized when the first bundling strap cannot be automatically retracted completely.

The main shaft may be separate from or integrated with the hand wheel. If the main shaft is separate from d the hand wheel, the both may be matched with each other through a special-shaped head and a special-shaped hole and then connected and fixed by a screw.

Preferably, the hand wheel assembly further comprises a damping elastic member which can reduce rotational speed of the main shaft when a winding speed of the first bundling strap is too fast. The damping elastic member may be a compression spring or the like, and is arranged between the hand wheel and the base, to increase the fractional damping between the main shaft and the base, thereby reducing the winding speed and prevent the barbs from rebounding quickly to hurt the operator.

The hand wheel may be in different shapes, such as a disc-shaped hand wheel or an impeller-shaped hand wheel, when the hand wheel is an impeller-shaped hand wheel, a hand wheel box connected to the base is disposed on a periphery of the hand wheel, thereby preventing the quickly rotating hand wheel from attaching the operator's hand during automatic winding.

Compared with the prior art, the present invention has the following advantages. In the safety tensioning device for automobiles of the present invention, since the moment M1 produced by the stop plate on the reel is less than the moment M2 produced by the coil spring on the main shaft in the operating state, the reel can automatically wind the first bundling strap. Therefore, the safety tensioning device for automobiles of the present invention can automatically wind the first bundling strap in the release state, and can also automatically wind the first bundling strap when the first bundling strap is loose due to jolts in the operating state, so that the first bundling strap is always kept in the tensioned state, thereby preventing unhooking and greatly improving the use safety. Moreover, when the coil spring is failed, the first bundling strap can be wound by the hand wheel, and the retraction speed can be controlled by the damping elastic member, thereby avoiding an occurrence of accidents of hurting the operator or other persons due to a rebounding of the hook of the first bundling strap during the strap retraction process.

Figure 1:
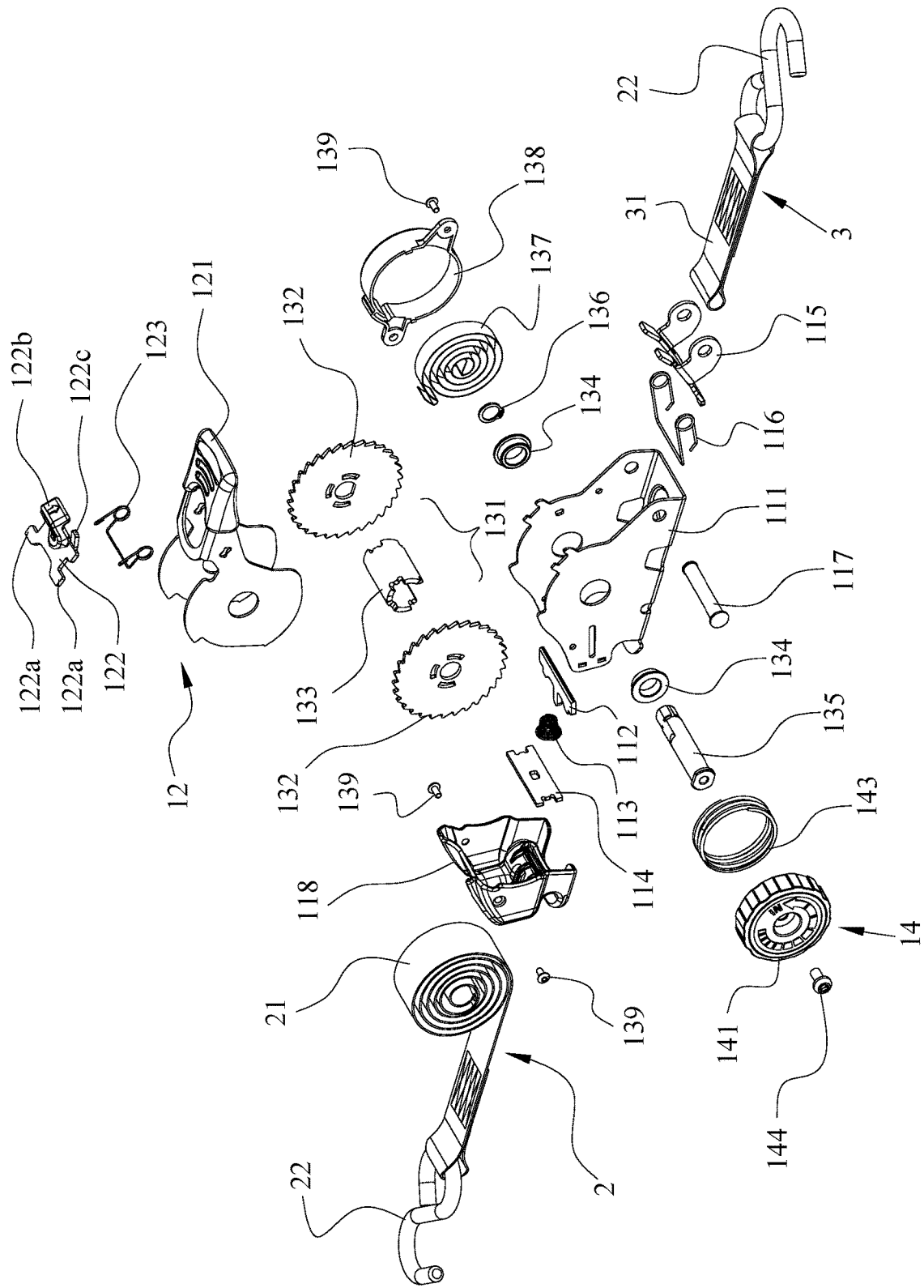
FIG. 1 is an exploded view of a safety tensioning device for automobiles according to Embodiment 1 of the present invention.
Figure 2:
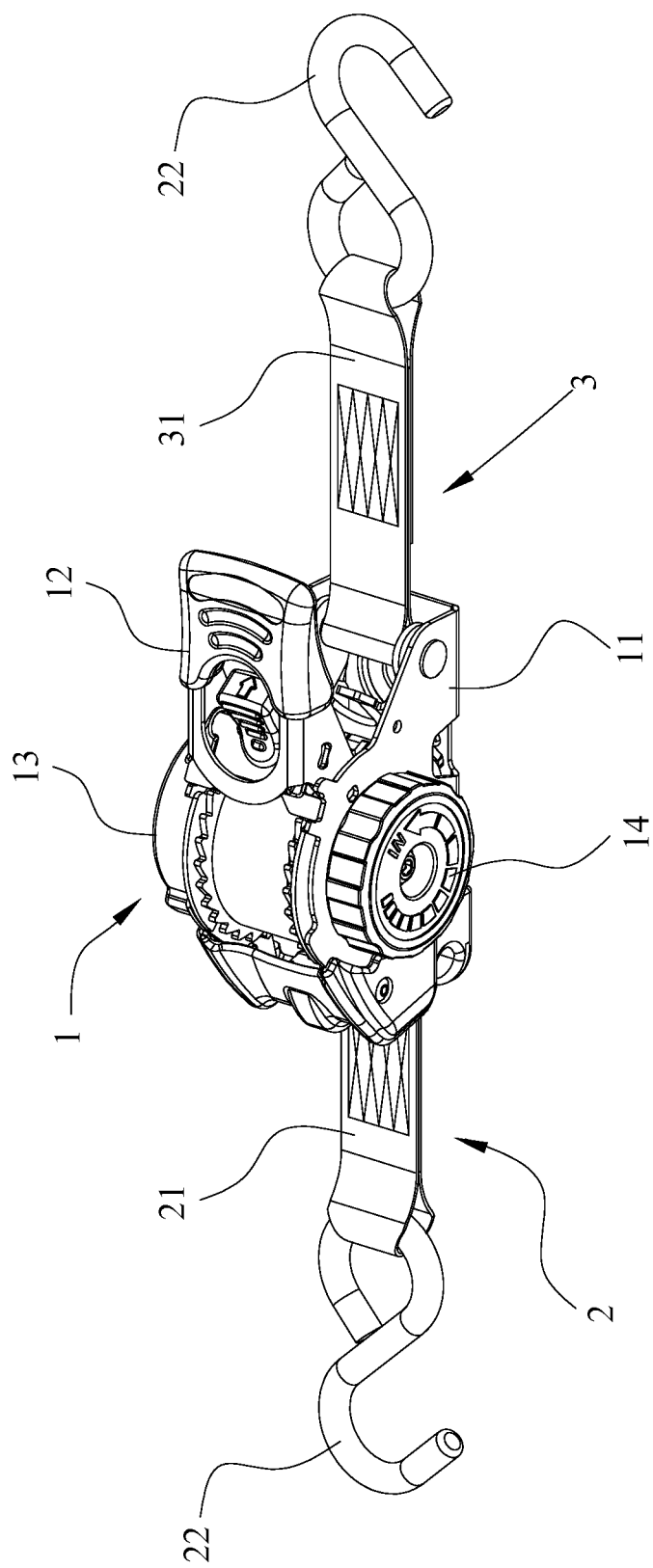
FIG. 2 is a perspective view of the safety tensioning device for automobiles according to Embodiment 1 of the present invention.
Figure 3:
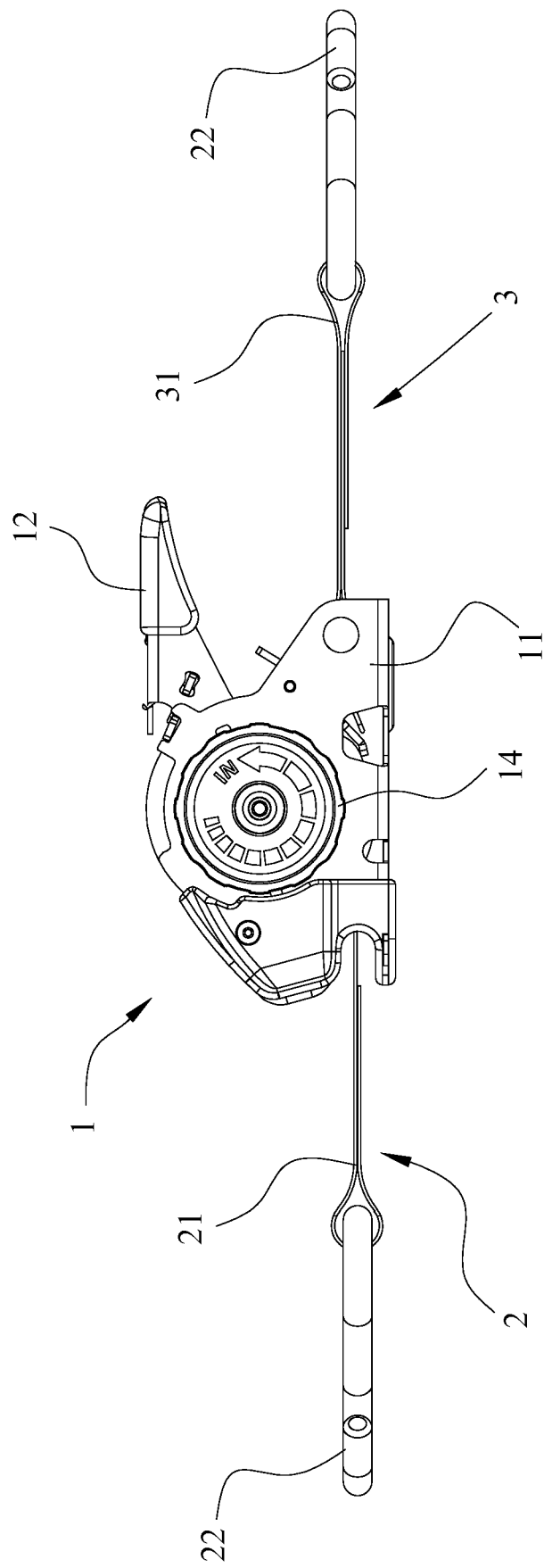
FIG. 3 is a front view of the safety tensioning device for automobiles according to Embodiment 1 of the present invention.
Figure 4:
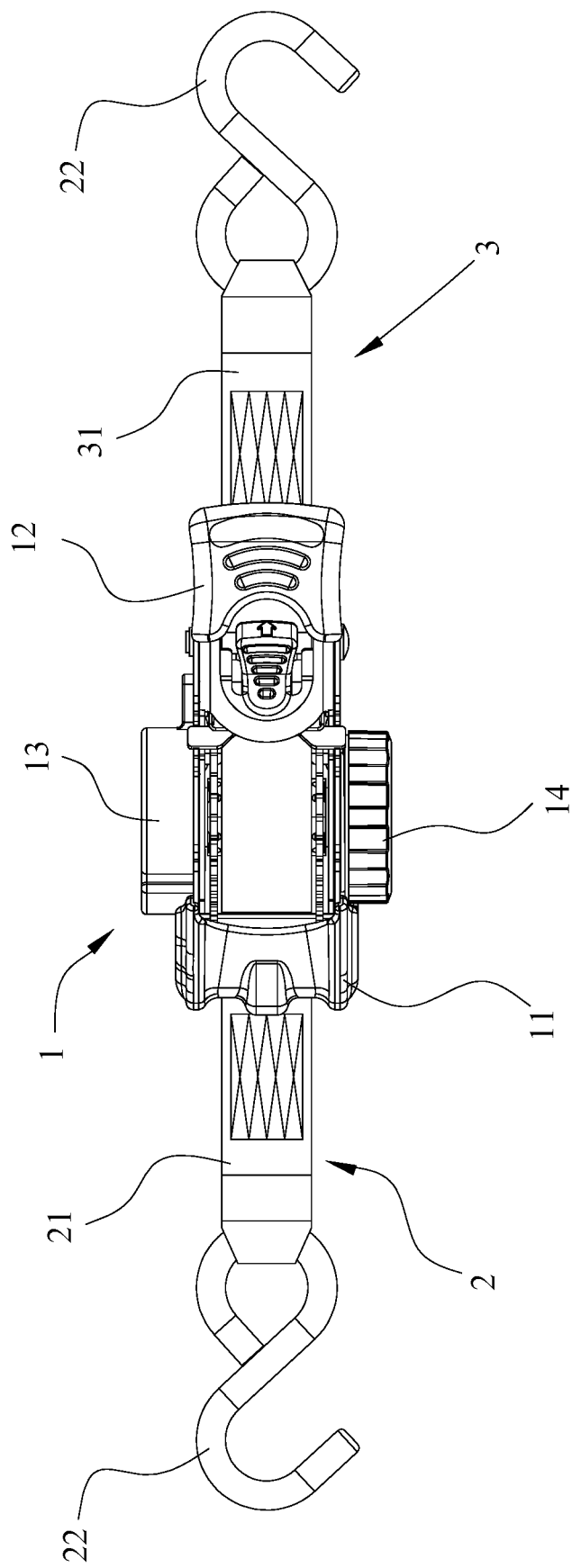
FIG. 4 is a top view of the safety tensioning device for automobiles according to Embodiment 1 of the present invention.

The reference numbers and the corresponding names of components are listed as below:

1: device body; 11: base assembly; 111: base; 111a: tensioning region; 11b: working region; 111c: release region; 111d: barb; 111f: protrusion; 111e: connecting hole; 112: stop plate; 113: stop plate spring; 114: support plate; 115: pressing plate; 115a: front end of the pressing plate; 115b: rear end of the pressing plate; 116: pressing plate spring; 117: connecting shaft; 118: housing; 118a: notch; 118b: groove; 118c: strap passage hole; 12: handle assembly; 121: handle; 121a: cavity; 121b: hole; 121c: groove; 121d: first bump; 121e: second bump; 121f: hole; 122: driving pawl; 122a: limiting block; 122b: button; 122c: push block; 122d: convex core; 123: pawl spring; 13: reel assembly; 131: reel; 132: ratchet wheel; 133: drum; 134: shaft sleeve; 135: main shaft; 135a: first end; 135b: second end; 136: clamp spring; 137: coil spring; 138: coil spring box; 139: rivet; 14: hand wheel assembly; 141: hand wheel; 142: hand wheel box; 143: damping spring; 144: screw;

2: first bundling strap; 21: first woven strap; 22: hook; 3: second bundling strap; and, 31: second woven strap.

DETAILED DESCRIPTION OF THE INVENTION

The present invention will be further described below in detail by embodiments with reference to the accompanying drawings.

Embodiment 1

As shown in FIGS. 1-4, the safety tensioning device for automobiles in this embodiment mainly comprises a device body 1, a first bundling strap 2 and a second bundling strap 3.

The device body 1 comprises a base assembly 11, a handle assembly 12, a reel assembly 13 and a handle wheel assembly 14. At least one first bundling strap 2 with or without a hook needs to be connected to the device body 1 for use. Preferably, the first bundling strap 2 comprises a first woven strap 21 which can be rolled and a hook 22. The second bundling strap 3 comprises a short second woven strap 31 and a hook 22.

The base assembly 11 comprises a base 111 having a front end, a rear end, a top and a bottom. A housing 118, a support plate 114, a stop plate 112 and a stop plate spring 113 are disposed at the front end of the base 111, and a pressing plate 115 and a pressing plate spring 116 are disposed at the rear end thereof, which are pivoted to the base 111 through a connecting shaft 117. The connecting shaft 117 is also used for connecting the second bundling strap 3. The stop plate 112 may be of a sliding type or a swinging type, and the stop plate 112 is shown as being of a sliding type in figures. The stop plate spring 113 may also be a compressing spring or a torsion spring, and the stop plate spring 113 is shown as a compression spring in figures.

The handle assembly 12 comprises a handle 121, a driving pawl 122 having a front end and a rear end and a pawl spring 123. The driving pawl 122 has a plurality of protruded limiting blocks 122a on two sides of the front end of the driving pawl 122, a button 122b in a middle of the rear end thereof, and a plurality of push blocks 122c on two sides of the rear end thereof.

Figure 5:
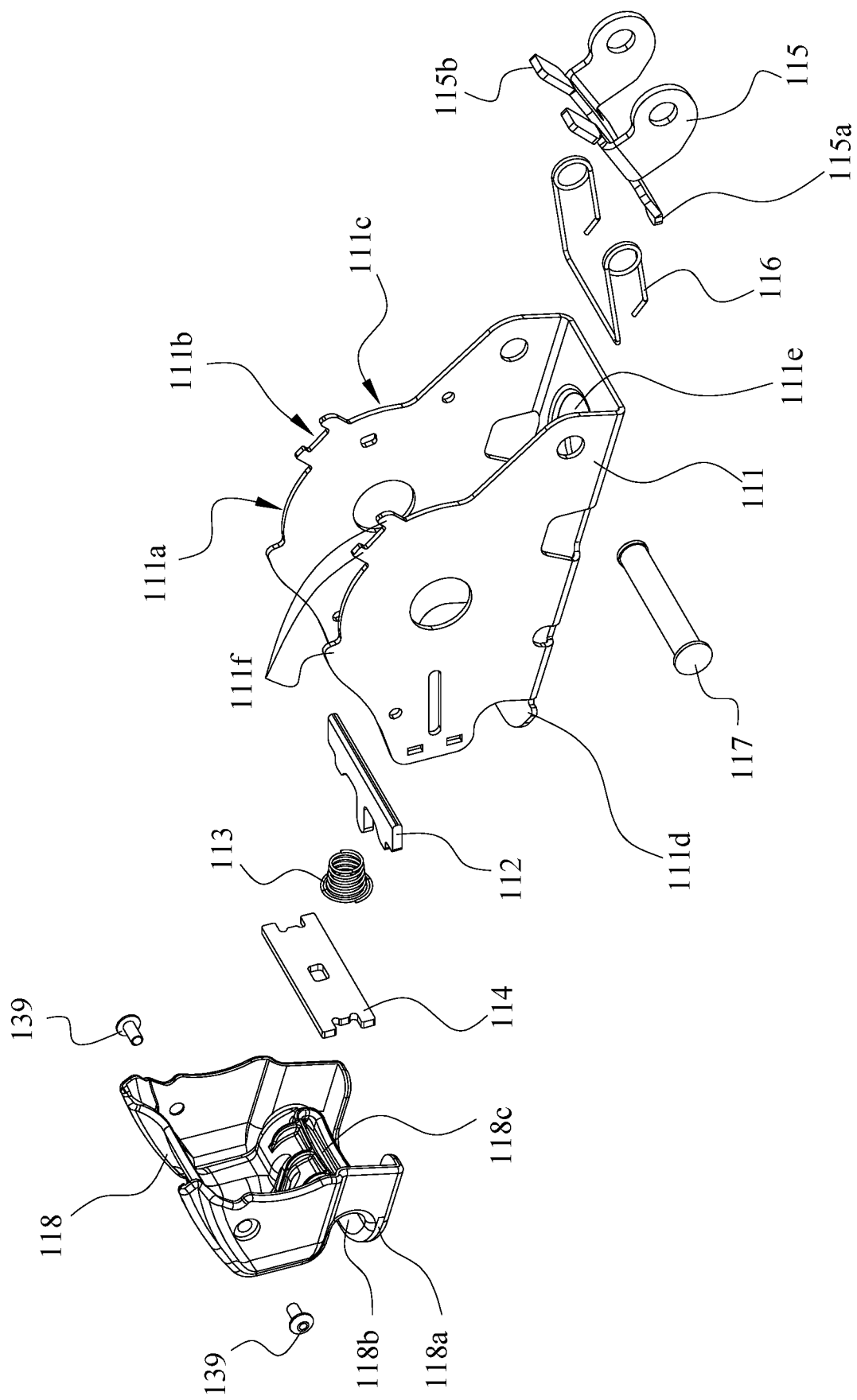
FIG. 5 is an exploded view of a base assembly according to Embodiment 1 of the present invention.

As shown in FIG. 5, three recessed operating regions are separated by a plurality of protrusions 111f on the top of the base 111. The three operating regions are a tensioning region 111a, a working region 111b and a release region 111c distributed successively from front to back and are used for receiving the limiting block 122a, and different regions have different functions. Herein, a side the base 111 located at the first bundling strap 2 is the front side, and the other side thereof is the rear side.

Figure 6:
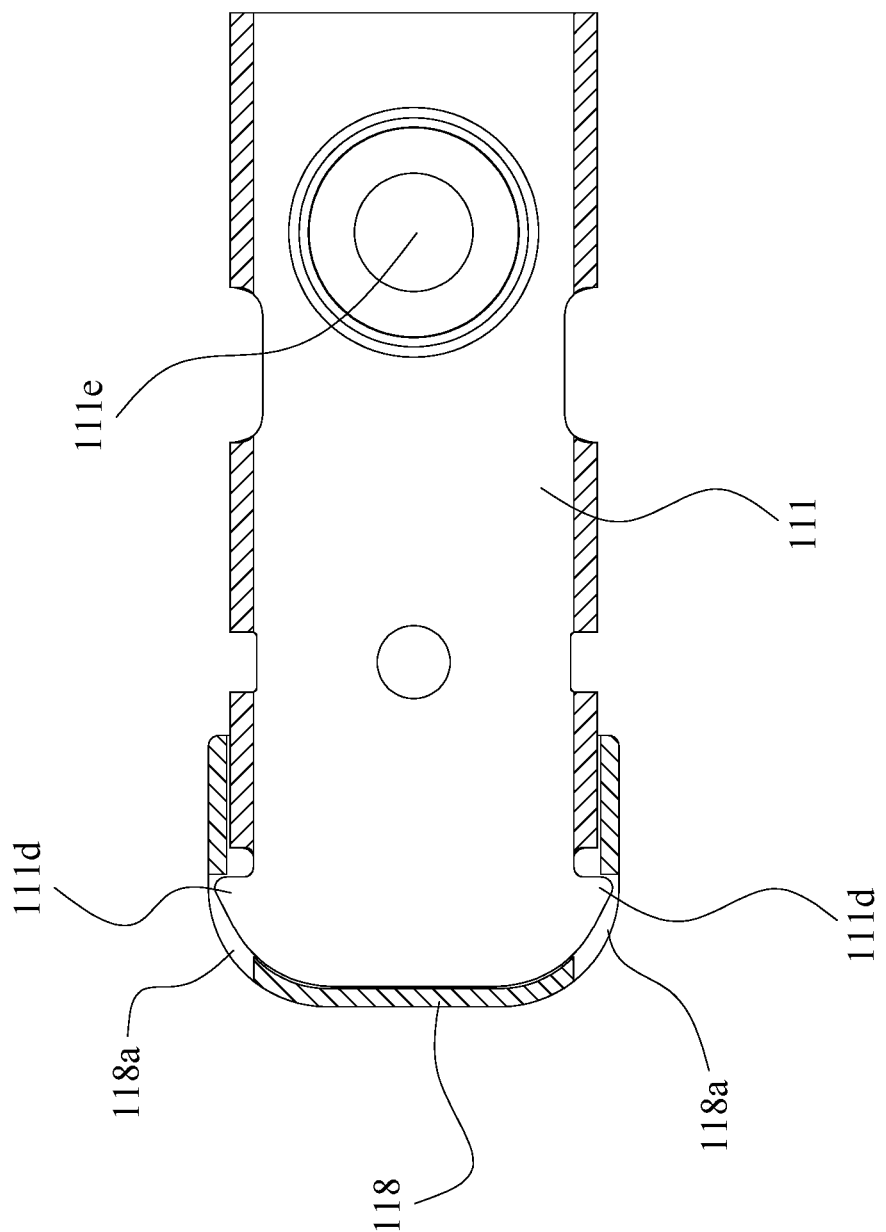
FIG. 6 is a sectional view of the base and the housing according to Embodiment 1 of the present invention.
Figure 7:
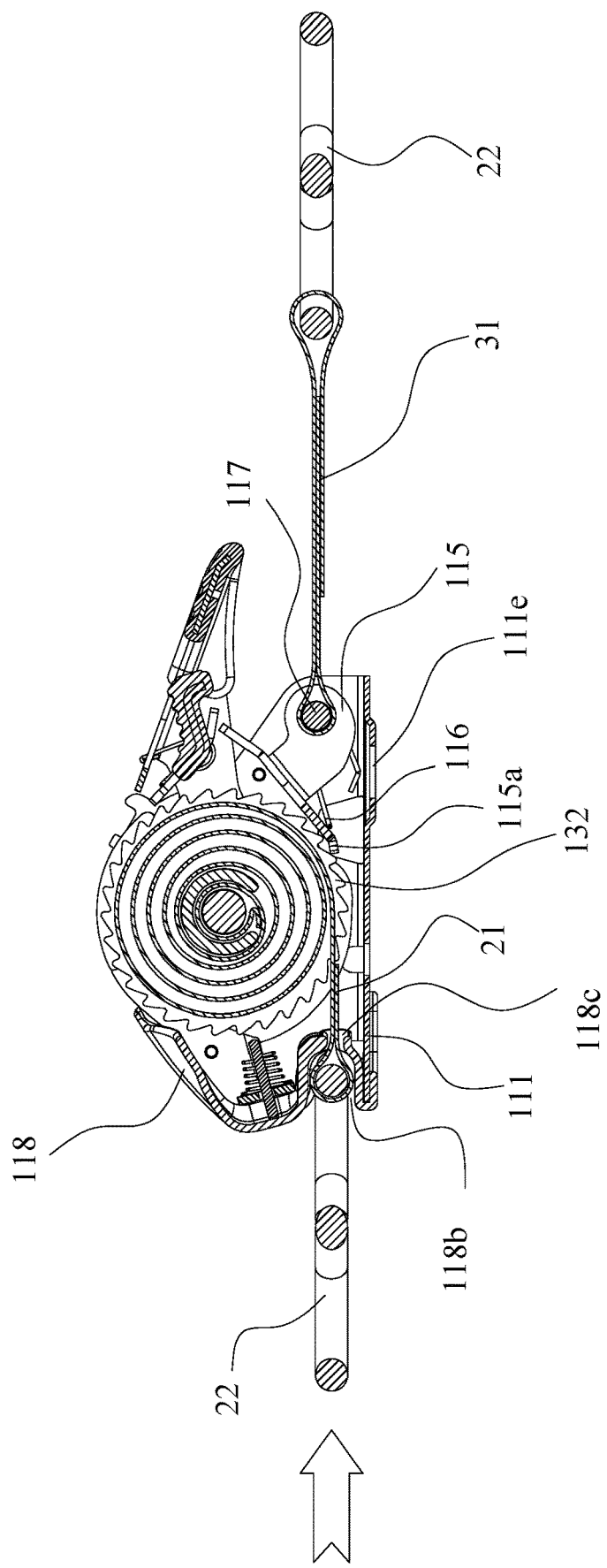
FIG. 7 is a sectional view of the safety tensioning device when a hook of a first bundling strap is completely retracted according to Embodiment 1 of the present invention.

As shown in FIGS. 5, 6 and 7, the base 111 is U-shaped, and a support plate 114 is disposed in the front end of the base 111 to fix an opening of the U-shaped base. The support plate 114 also plays a role in supporting the stop plate spring 113, and the stop plate 112 slides radially relative to an axis under the action of the spring 113 and tends to the axis. Each protruded barb 111d is disposed on each side of the front end of the base 111 and is matched with each notch 118a below the housing 118. After assembling, the both are buckled with each other, so that the housing 118 is not easy to fall off. Two sides of an upper portion of the housing 118 are also fixed to the base 111 by a plurality of rivets 139. The housing 118 has a groove 118b in a front side of the housing 118. The groove 118b is used for restricting and receiving the hook 22 of the first bundling strap 2 and plays a buffering role when the hook 22 is retracted rapidly. The groove 118b has a strap passage hole 118c for allowing the first bundling strap 2 to pass through in a middle of the groove 118b.

The base 111 has a connecting hole 111e which can allow a bolt or rivet to pass through so as to fix the device body 1 at a corresponding position of the automobile or cargo, so that the second bundling strap 3 is not needed, and the device body 1 can operate by only using the first bundling strap 2.

The connecting shaft 117 is mounted in the rear end of the base 111, and a second first bundling strap 31 is used for connecting the device body 1 to the second bundling strap 3. Meanwhile, the connecting shaft 117 is pivoted to a pressing plate 115 and a pressing plate spring 116. Under the action of the spring force, the pressing plate 115 swings around the connecting shaft 117, urging a front end 115a of the pressing plate 115 against the ratchet wheel 132 to generate pressure to stop the rotation of the reel 131.

Figure 8:
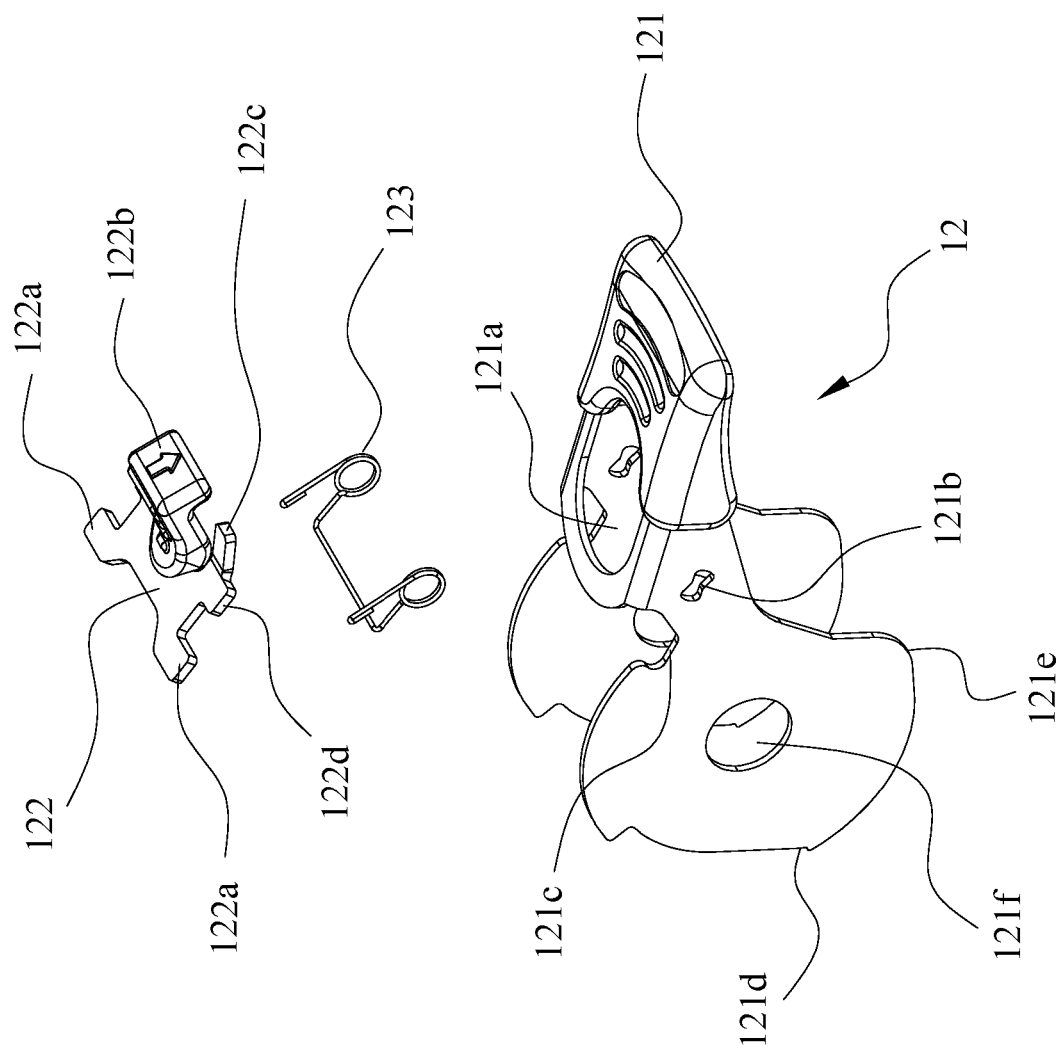
FIG. 8 is an exploded view of a hand wheel assembly according to Embodiment 1 of the present invention.

As shown in FIG. 8, the handle assembly 12 comprises the handle 121, the driving pawl 122 and the pawl spring 123. The plurality of protruded limiting blocks 122a is arranged on two sides of the front end of the driving pawl 122, the button 122b is arranged in the middle of the rear end thereof, the plurality of push blocks 122c is arranged on two sides of the rear end thereof, and a convex core 122d is arranged in the middle of the driving pawl 122 to serve as a rotation center of the driving pawl 122. The pawl spring 123 is sleeved on the convex core 122d. The handle 121 has a cavity 121a for receiving the button 122b on a top of the handle 121, a hole 121b for receiving the convex core 112d on each side of the handle 121, a groove 121c for receiving the limiting block 122a, and a hole 121f for receiving a main shaft 135 and a shaft sleeve 134. A first bump 121d and a second bump 121e are arranged in the front and rear of a bottom edge of the handle 121 to push the stop plate 112 and the pressing plate 115, respectively.

Figure 9:
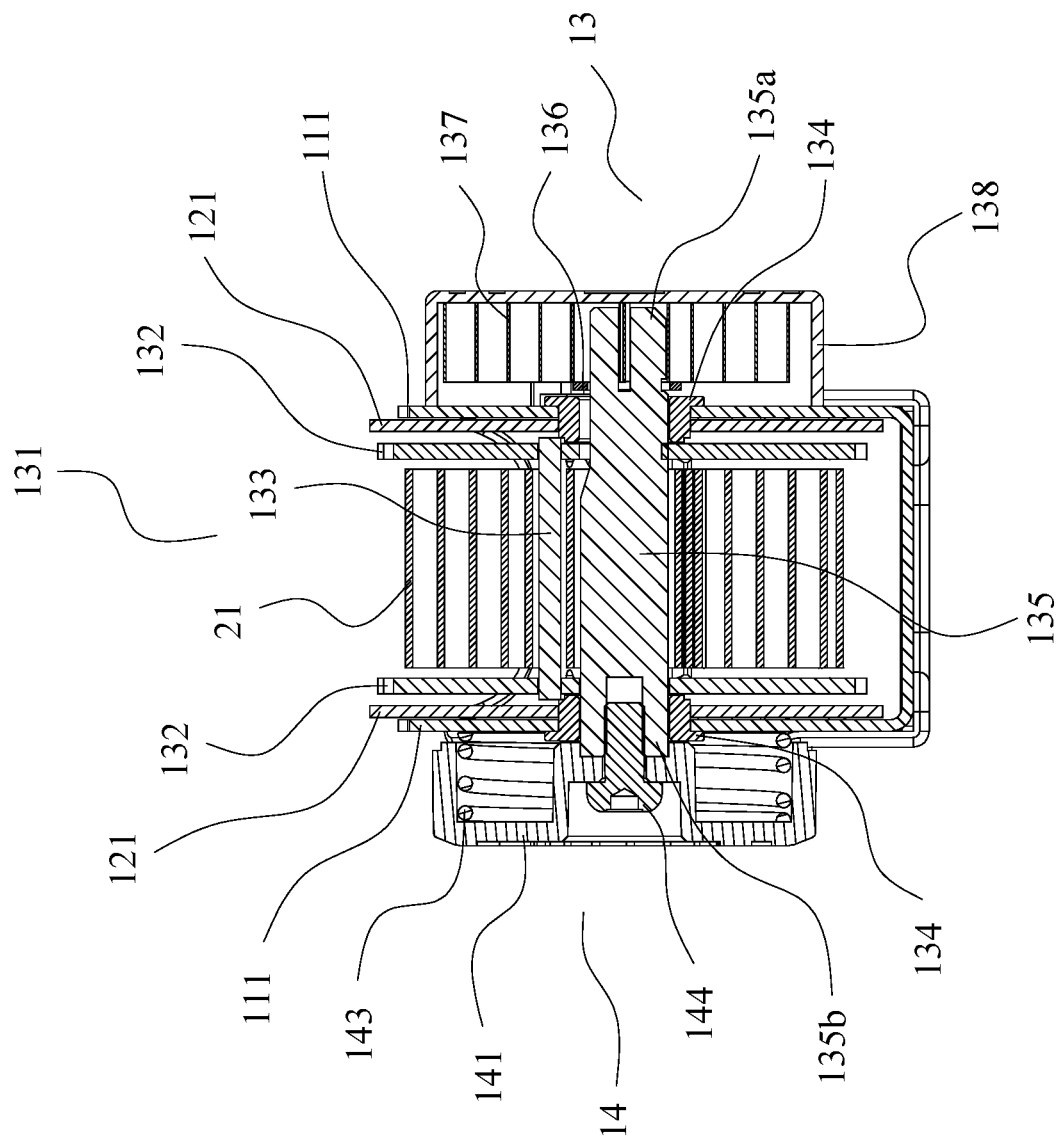
FIG. 9 is a sectional view of the safety tensioning device along the axis of the main shaft according to Embodiment 1 of the present invention.

As shown in FIG. 9, the reel assembly 13 comprises a reel 131, the main shaft 135, a coil spring 137 and the shaft sleeve 134. The reel 131 is a disc shape consisting of two ratchet wheels 132 and a drum 133, and is used for winding the first bundling strap 2. The handle assembly 12 and the base assembly 11 are pivoted through the shaft sleeve 134, the handle 121 is located on an inner side of the base 111, and the reel 131 is located in a center of an inner side of the handle 121. The main shaft 135 passes through the shaft sleeve 134 and the reel 131 and is restricted by a clamp spring 136. The main shaft 135 has a special-shaped section which can be inserted into the special-shaped hole on the ratchet wheel 132, so that the reel 131 can drive the main shaft 135 to rotate together, or the main shaft 135 can drive the reel 131 to rotate together. A first end 135a of the main shaft 135 is connected to an inner hook of the coil spring 137, an outer hook of the coil spring 137 is connected to a coil spring box 138, and the coil spring box 138 is fixed on the outer side face of the base 111. A second end 135b of the main shaft is connected to a hand wheel assembly 14.

The hand wheel assembly 14 may adopt many different structures. As shown in the figures in this embodiment, specifically as shown in FIGS. 1, 2, 3, 4, 9 and 10a, the hand wheel assembly 14 comprises a hand wheel 141, a damping elastic member 143 and a screw 144. The protruded second end 135b of the main shaft 135 has a special-shaped section which can be inserted into the special-shaped hole in the middle of the hand wheel 141, and the hand wheel 141 is fixed on the main shaft 135 by the screw 144, so that the main shaft 135 can be driven to rotate by rotating the hand wheel 141. The damping elastic member 143 is arranged between the hand wheel 141 and the base 111 to increase friction and reduce the speed of the first bundling strap 2 when it is retracted quickly, thereby preventing the hook 22 to rebounding quickly to hurt the operator. The damping elastic member may be a compression spring, etc. The hand wheel 141 is a common disc-shaped hand wheel.

Embodiment 2

Figure 10A:
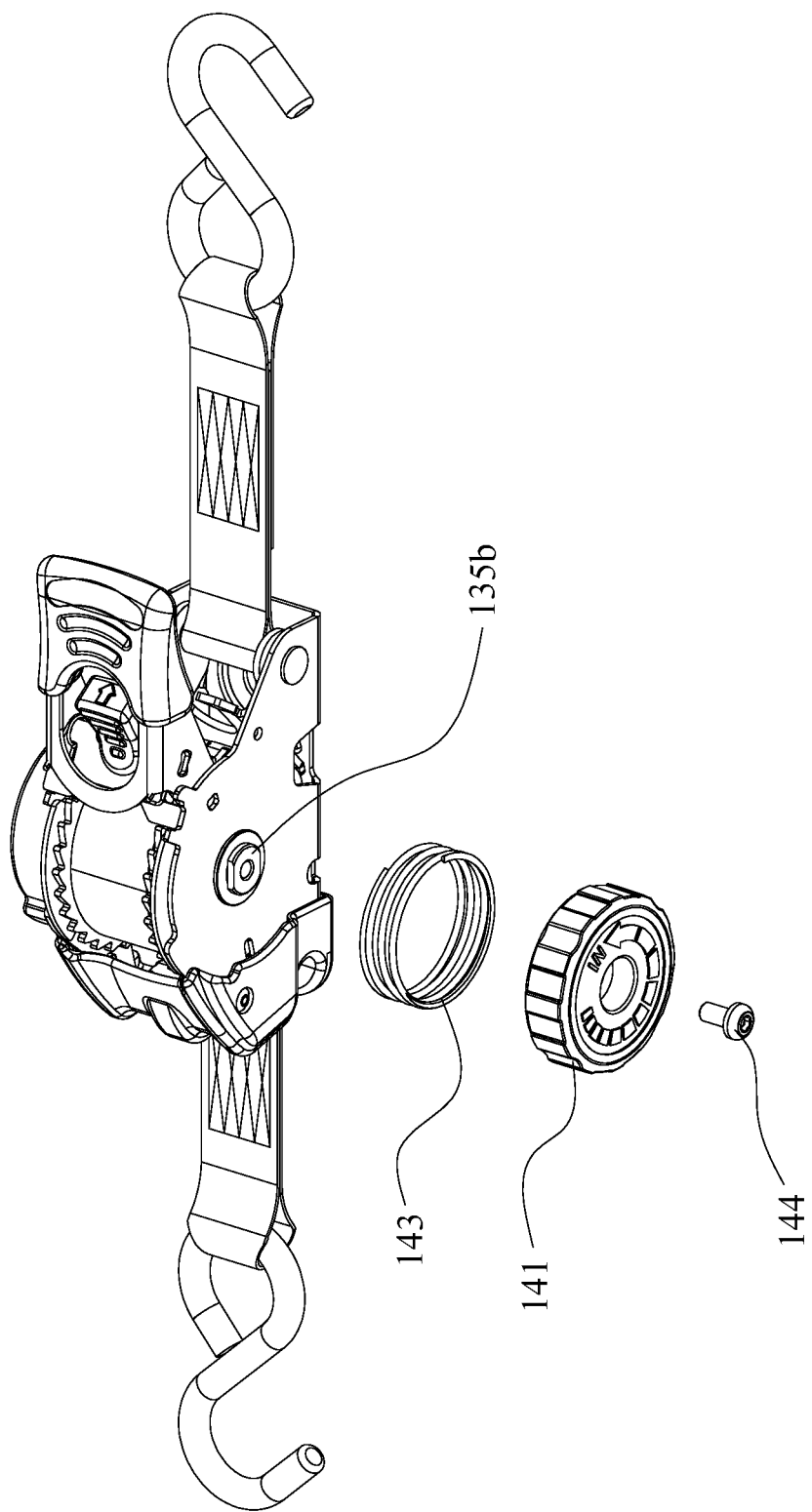
FIG. 10a is a perspective view of the hand wheel assembly according to Embodiment 1 of the present invention.
Figure 10B:
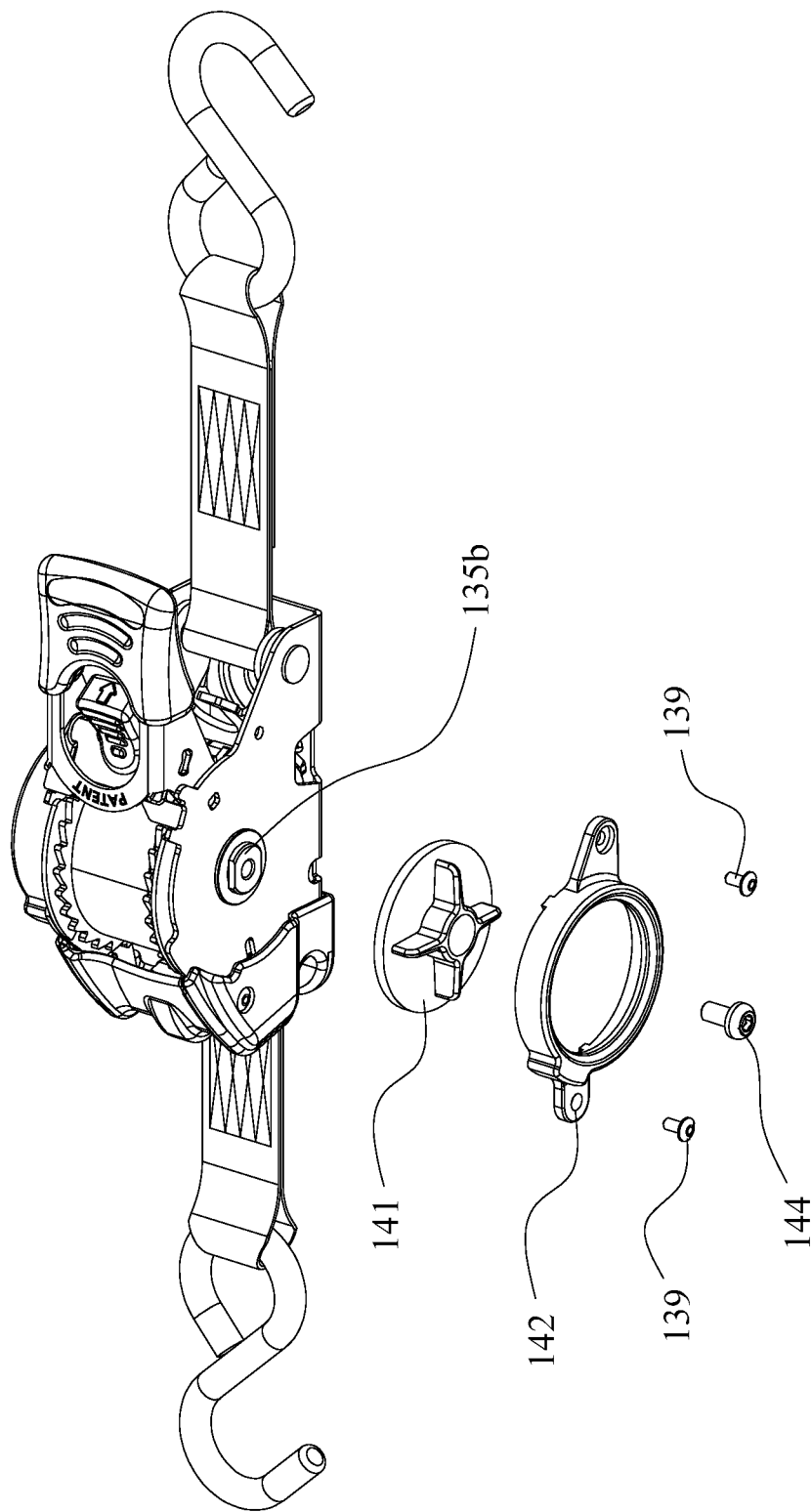
FIG. 10b is a perspective view of the hand wheel assembly according to Embodiment 2 of the present invention.
Figure 10C:
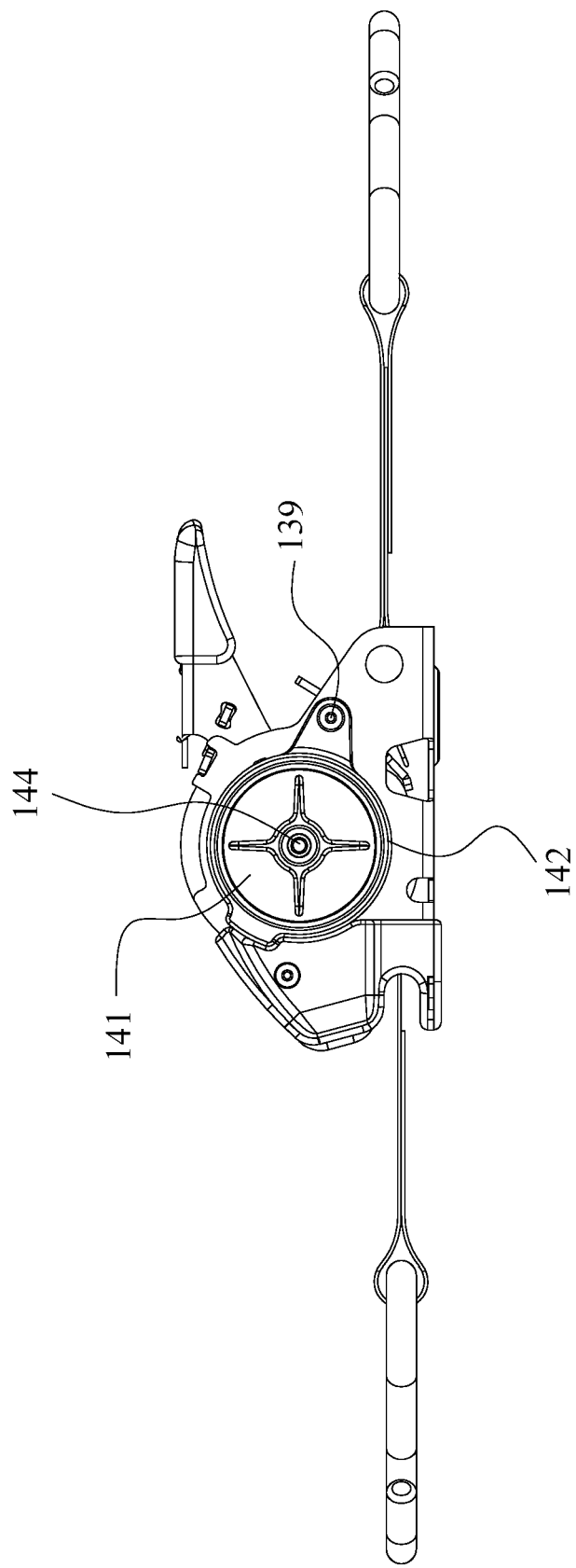
FIG. 10c is a front view of a safety tensioning device according to Embodiment 2 of the present invention.

As shown in FIGS. 10b and 10c, this embodiment differs from Embodiment 1 in that, a hand wheel is an impeller-shaped hand wheel. The hand wheel 141 is also fixed at the second end 135b of the main shaft 135 by the screw 144. To prevent the hand wheel 141 from attaching the operator's hand during its fast rotation, the hand wheel 141 has a hand wheel box 142 arranged on a periphery of the hand wheel 141, and the hand wheel box 142 is fixed on the side of the base 111 by the rivet 139.

The dynamic process of the tensioning device when in use will be described below with reference to the figures.

Figure 11:
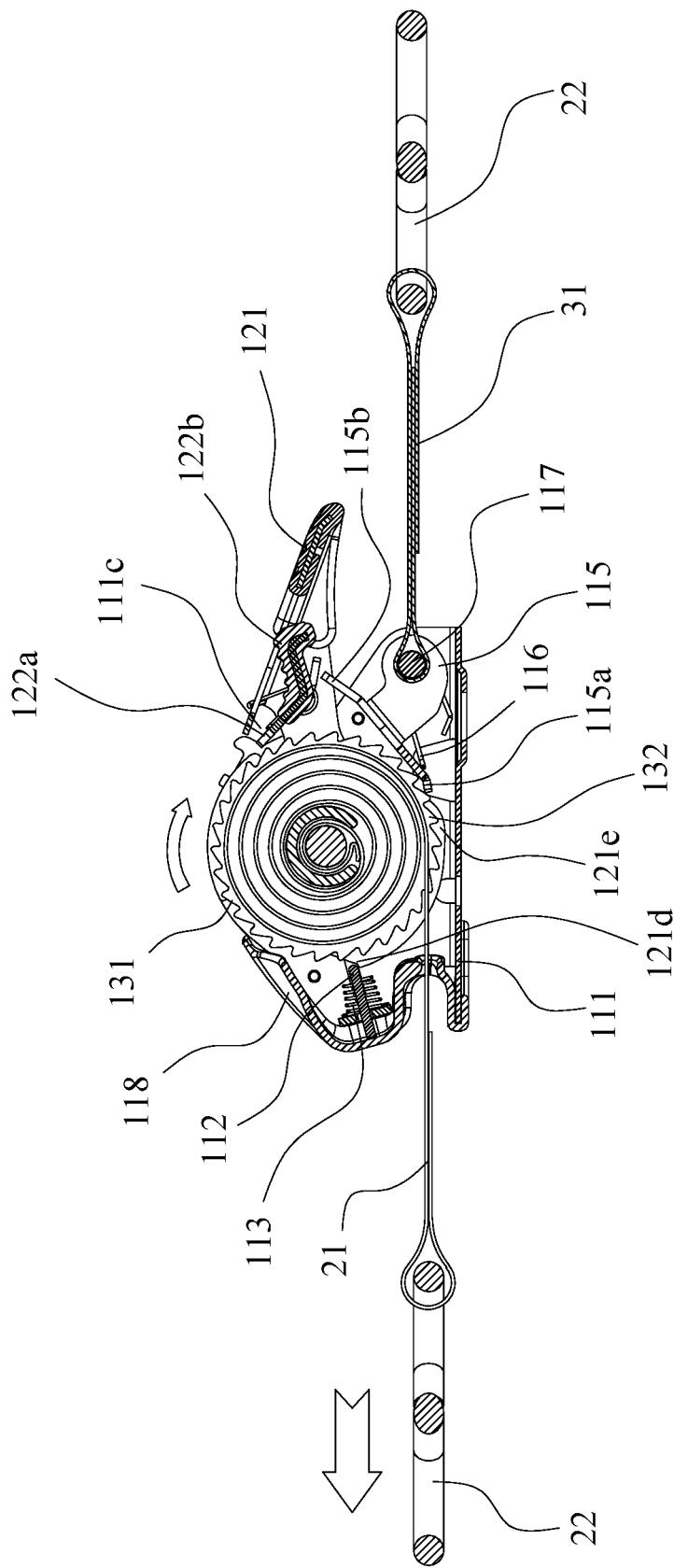
FIG. 11 is a sectional view of the safety tensioning device when the first bundling strap is in a release state according to Embodiment 1 of the present invention.

FIG. 11 is a schematic diagram of the safety tensioning device for automobiles when the first bundling strap 2 is in a release state. The button 122b is pressed down, the handle assembly 12 is rotated. When the limiting block 122a is restricted in the release region 111c of the base 111, the driving pawl 122 is separated from the ratchet wheel 132, and the stop plate 112 is pushed to separate from the ratchet wheel 132 by the first bump 121d of the handle 112. In this state, the front end 115a of the pressing plate 115 still presses the ratchet wheel 132 under the action of the spring 116. The moment M3 produced by the pressing plate 115 on the reel 131 is greater than the moment M2 produced by the coil spring, that is, M3>M2, so as to prevent the reel 131 from rotating freely.

The first bundling strap 2 is pulled outward by applying an additional force. At this time, a moment M4 will be produced on the reel 131. If M4>M2, the reel 131 will overcome the pressure caused by the pressing plate 115, and thus rotates in the shown direction. That is, the hook 22 and the first woven strap 21 is pulled out of the device body 1, the hook 22 can be hung on a corresponding securing point on the automobile or cargo according to actual needs.

Figure 12:
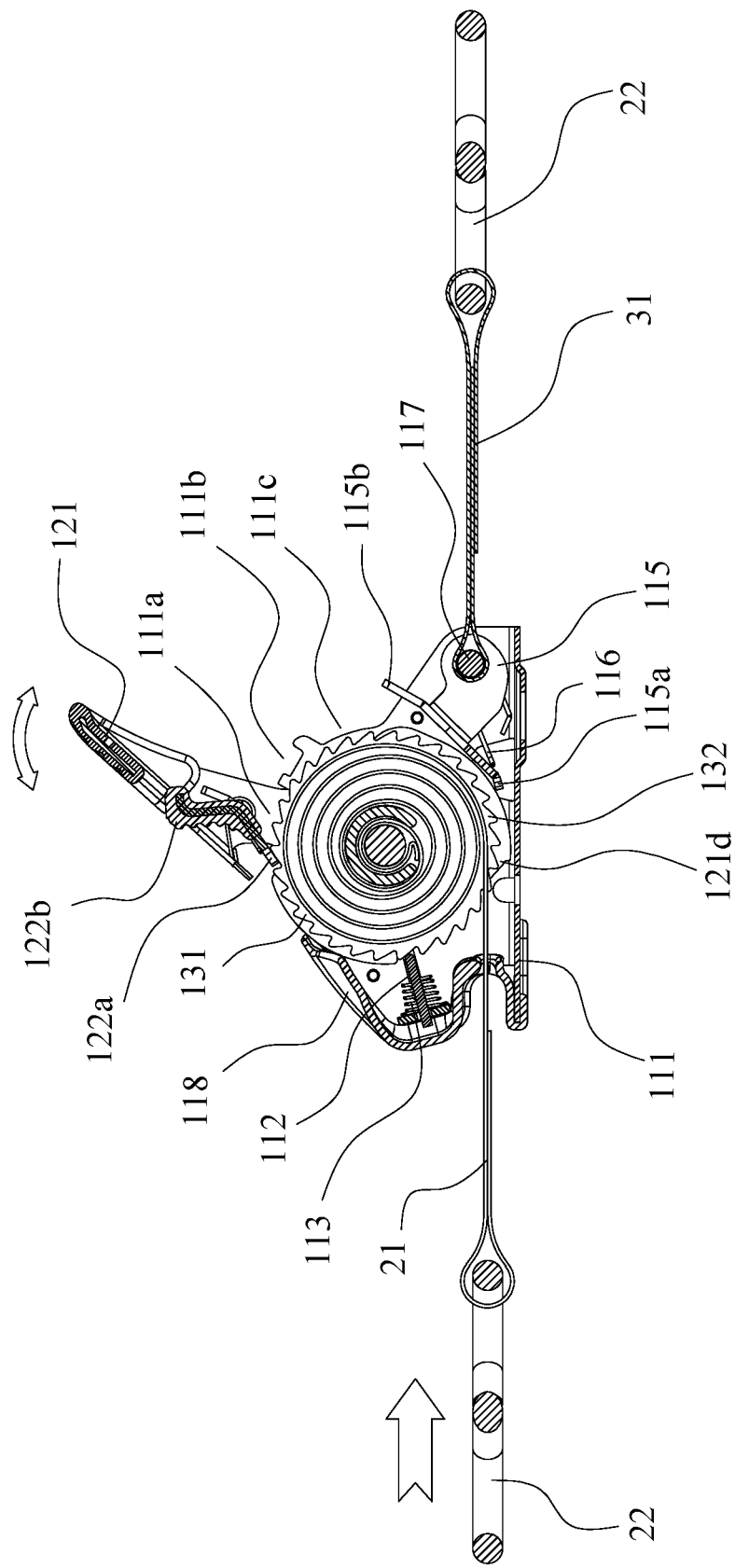
FIG. 12 is a sectional view of the safety tensioning device when the first bundling strap is in a tensioned state according to Embodiment 1 of the present invention.

FIG. 12 shows the safety tensioning device for automobiles when the first bundling strap 2 is in a tensioned state. After the hook 22 is hung on the corresponding securing point, the button 122b is pressed down, the handle assembly 12 is rotated, the limiting block 122a is restricted in the tensioning region 111a, and the driving pawl 122 is engaged with the ratchet wheel 132. At this time, the first bump 121d of the handle 121 is rotated to separate from the stop plate 112. Under the action of the spring 113, the stop plate 112 is pushed to a center of the reel 131 and engaged with the ratchet wheel 132. The handle assembly 12 is pushed repeatedly to drive the reel 131 to rotate counterclockwise as shown in FIG. 12, and the first bundling strap 2 is wound into the reel 131, thereby producing tension to realize the tensioning operation of the first bundling strap 2. The stop plate 112 prevents the ratchet wheel 132 from reverse rotation, so that the tension is maintained.

Figure 13:
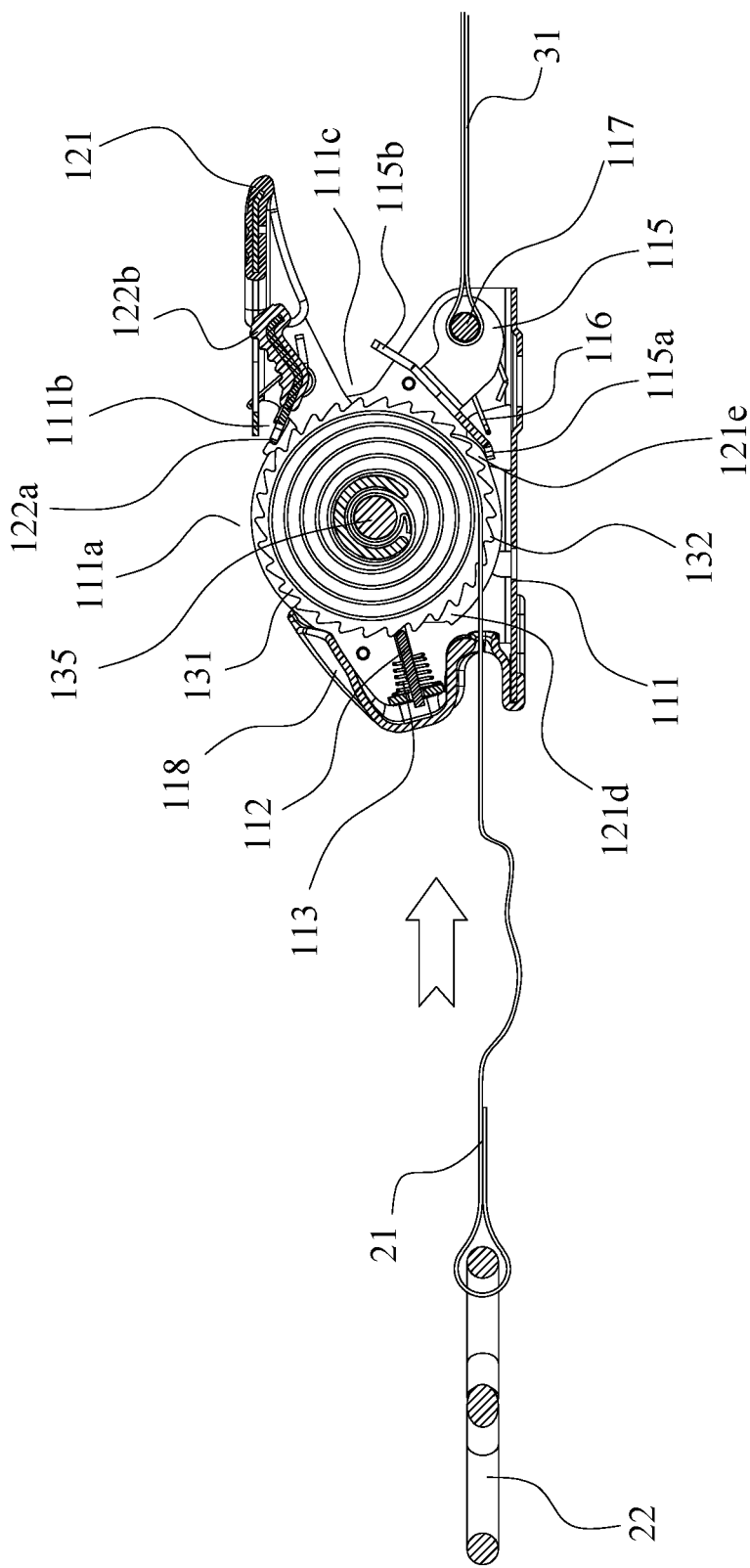
FIG. 13 is a sectional view of the safety tensioning device when in an operating state according to Embodiment 1 of the present invention.

FIG. 13 shows the safety tensioning device for automobiles when in an operating state. After the tensioning operation is completed, the button 122b is pressed down, the handle assembly 12 is rotated, and the limiting block 122a is restricted in the working region 111b. At this time, the driving pawl 122 is separated from the ratchet wheel 132. Meanwhile, the second bump 121e of the handle 121 pushes the front end 115a of the pressing plate 115 to separate from the ratchet wheel 132. At this time, only the stop plate 112 is engaged with the ratchet wheel 132 and prevents the ratchet wheel 132 from reverse rotation, thereby maintaining the tension, which means the tension device is in the working state.

In the operating state of the safety tensioning device for automobiles, in case of jolts, vibration, cargo slippage or the like, the originally tensioned first woven strap 21 may be loose. At this time, since the moment M1 produced by the stop plate 112 on the reel 131 is less than the moment M2 produced by the coil spring 137 on the main shaft 135, that is, M1<M2, under the action of the coil spring 137, the reel 131 overcomes the resistance of the stop plate 112 and rotates counterclockwise to wind the loose first woven strap 21 into the reel 131.

After use, the button 122b is pressed down, the handle assembly 12 is rotated, and the limiting block 122a is restricted in the release region 111c, as shown in FIG. 11. At this time, both the driving pawl 122 and the stop plate 112 are separated from the ratchet wheel 132 to release the tension on the first woven 21. Meanwhile, when the second bump 121e of the handle 121 is separated from the front end 115a of the pressing plate, the front end 115a of the pressing plate 115 rotates under the action of the spring 116 and presses on the ratchet wheel 132, so that the reel 131 is prevented from counterclockwise rotation under the action of the coil spring 137, and the first bundling strap 2 with the hook 22 is prevented from rapidly rebounding to hurt the operator.

Figure 14:
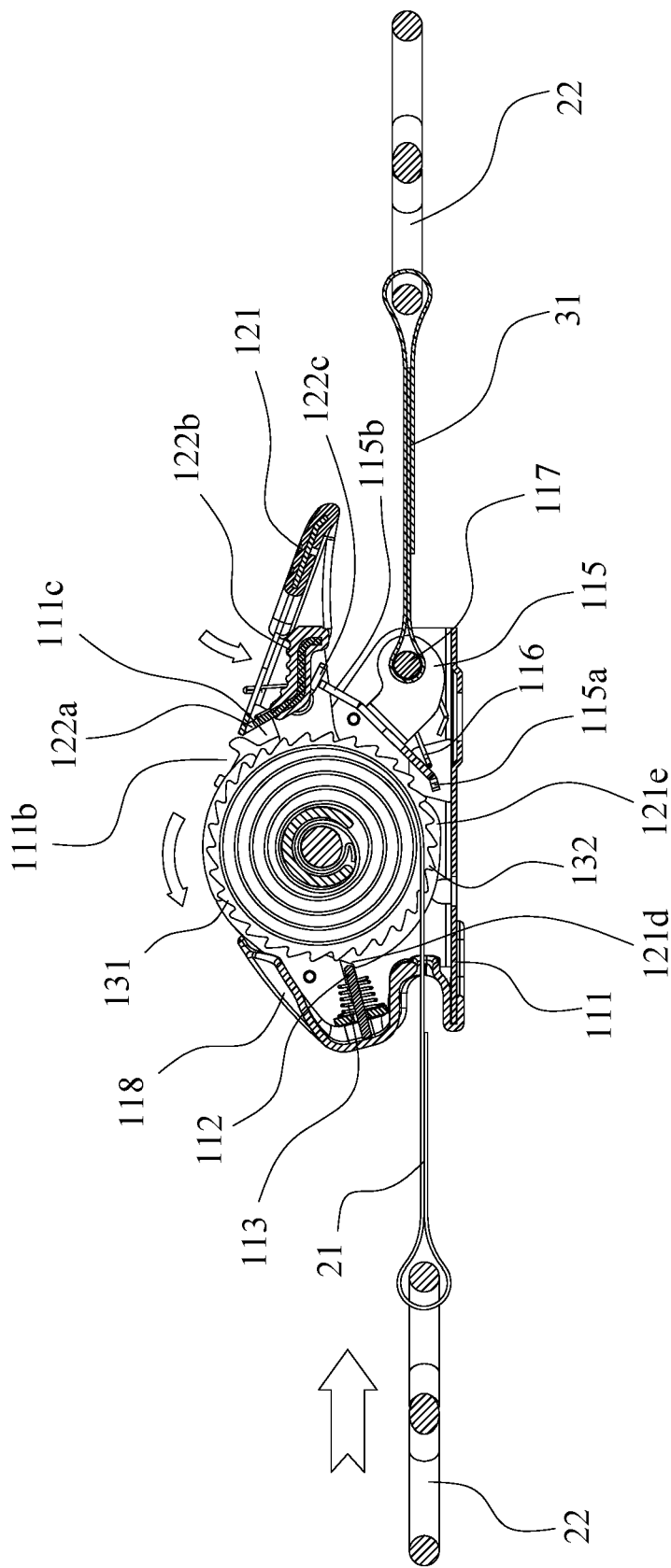
FIG. 14 is a sectional view of the safety tensioning device when the first bundling strap is in an automatic winding state according to Embodiment 1 of the present invention.

As shown in FIG. 14, if the first woven strap 21 and the hook 22 are continuously retracted, it is only necessary to press down the button 122b on the driving pawl 122 again, the push block 122c at the rear end of the driving pawl 122 come into contact with the rear end 115b of the pressing plate 115 and pushes the pressing plate 115 to rotate, so that the front end 115a of the pressing plate 115 is separated from the ratchet wheel 132. At this time, the reel 131 rotates counterclockwise under the action of the coil spring 137 to wind the first bundling strap 2 into the reel 131.

Figure 15:
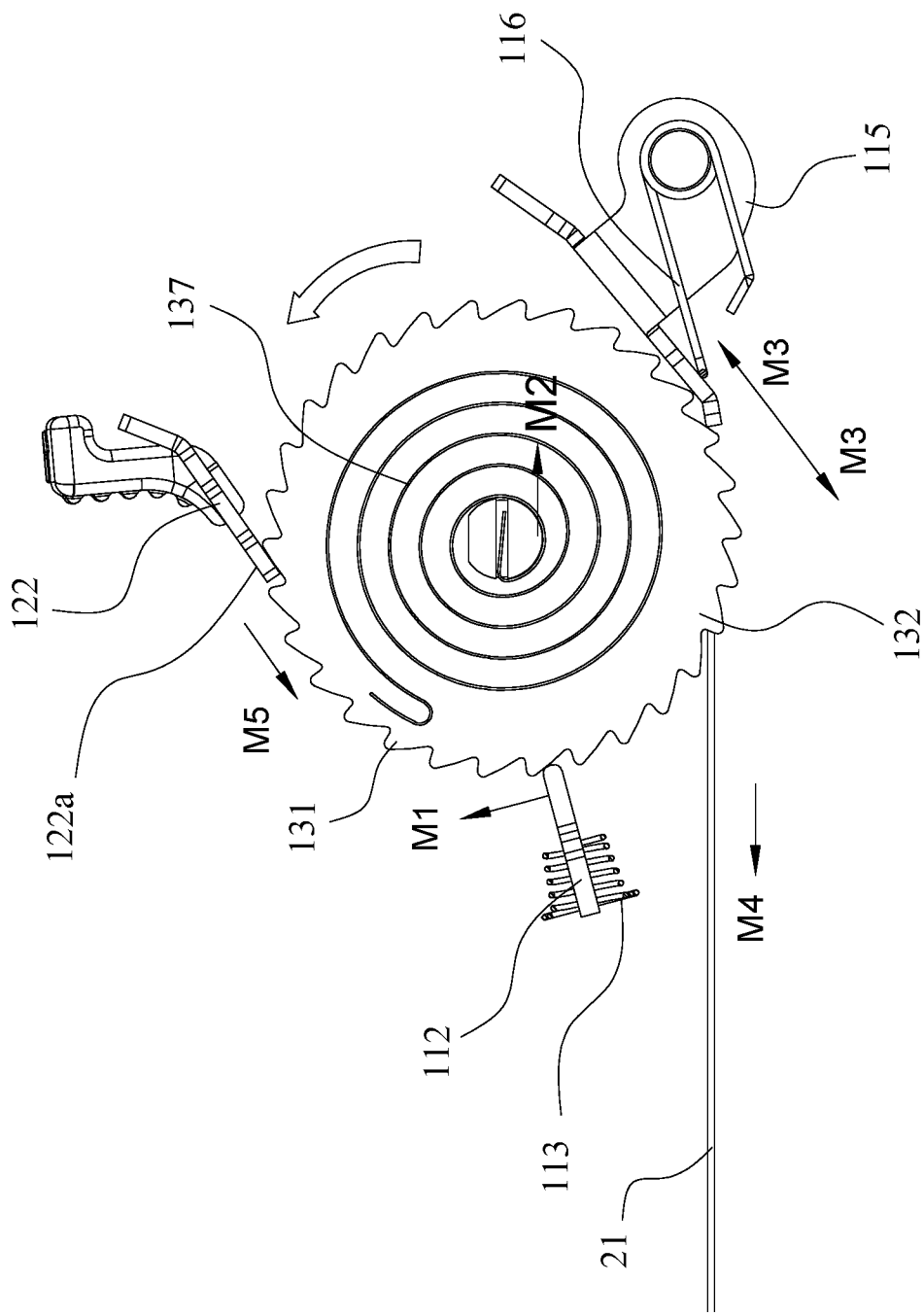
FIG. 15 is a schematic view of a torque of the present invention.

The related torque on the reel 131 will be further explained, as shown in FIG. 15, where M1 is the torque produced during a process of preventing the counterclockwise rotation (winding) of the reel 131, and the force comes from the spring 113. M2 is the torque produced by the energy-stored coil spring 137 when acting on the main shaft 135, and this torque can drive the reel 131 to rotate counterclockwise (winding). M3 is the torque which is produced by the pressing plate 115 when pressing the ratchet wheel 132 under the action of the spring 116 and can prevent the counterclockwise rotation (winding) and clockwise rotation (unwinding) of the reel 131. The three torques (called passive torques) are produced by the elastic force of the elastic member arranged at the corresponding position. M4 is the torque produced on the reel 131 by an external force when the first woven strap 21 is pulled out by the hand, and is only used for pulling out the first woven strap 21 or adjusting a length of the first woven strap 21 in the early stage of operation. M5 is the torque (called an active torque) produced by an external force when pushing the handle 122 and the ratchet wheel 132 to drive the reel 131, and is only used for the tensioning operation.

When the reel 131 is in a same diameter and size, a magnitude of the active torque depends on a magnitude of the applied external force, and a magnitude of the passive torque depends on a magnitude of the elastic force of the corresponding elastic member.

To achieve the functional effect of the present invention, the magnitude of the three passive torques is defined as follows: M1<M2<M3.

When the limiting block 122a on the driving pawl 122 is restricted in the working region 111b, both the driving pawl 122 and the pressing plate 115 are separated from the ratchet wheel 132. Since M1<M2, the coil spring 137 can drive the main shaft 135 and the reel to rotate counterclockwise so as to wind the first bundling strap 2.

When the limiting block 122a on the driving pawl 122 is restricted in the release region 111c, both the driving pawl 122 and the stop plate 112 are separated from the ratchet wheel 132. Since M2<M3, the ratchet wheel 132 still cannot rotate. At this time, if a corresponding force is applied to the first woven strap 21 to allow M4>M3, the reel 131 overcomes the pressure from the pressing plate 115 to rotate clockwise, so that the first woven strap 21 is pulled out. Or, the button 122b is pressed down to push the pressing plate 115 to separate from the ratchet wheel 132. The reel 131 rotates counterclockwise only under the torque M2, so that the first bundling strap 21 can be quickly retracted into the reel 131.

It is inevitable that the elasticity of the coil spring 137 will be attenuated to a certain extent after a period of time so that the first woven strap 21 cannot be retracted completely. It is also possible that the coil spring 137 will break and unhook after long-term use or under other unexpected circumstances, resulting in the complete failure of the automatic winding function. At this time, it is only necessary to rotate the hand wheel 141 counterclockwise to drive the main shaft 135 and the reel 131 to rotate, so that the first woven strap 21 and the hook 22 are completely retracted manually.

The invention claimed is:

1. A safety tensioning device for automobiles, comprising:
   a base having a front end, a rear end, a top and a bottom;
   a handle;
   a first bundling strap having a first woven strap and a hook;
   a winding assembly disposed on the base and driven by a main shaft, the winding assembly having a reel for winding the first bundling strap using a ratchet wheel and a coil spring;
   a stop plate and a pressing plate disposed respectively at the front end and the rear end of the base;
   a driving pawl having one or more limiting blocks is rotatably connected to the handle;
   wherein,
   the handle is pivoted to the base and is capable of rotating about the main shaft, the rotation of the handle changes an acting state of the stop plate and the pressing plate to the ratchet wheel;
   the base has three operating regions on the top of the base: a tensioning region, a working region and a release region, the three operating regions cooperate with the limiting block of the driving pawl;
   when the limiting block of the driving pawl is restricted to the working region, both the driving pawl and the pressing plate are separated from the ratchet wheel, the stop plate is engaged with the ratchet wheel, and, a moment M1 produced by the stop plate on the reel is less than a moment M2 produced by the coil spring on the main shaft so as to tension the first bundling strap on the reel by the coil spring.

2. The safety tensioning device of claim 1, wherein the handle has a first bump and a second bump on a bottom of the handle for respectively pushing the stop plate and the pressing plate, the handle can push the stop plate and the pressing plate during rotation of the handle, so as to engage or disengage the stop plate with the ratchet wheel, and attach or separate the pressing plate from the ratchet wheel, to change the acting state of the stop plate and the pressing plate to the ratchet wheel.

3. The safety tensioning device of claim 1, wherein the driving pawl has a push block at a rear end of the driving pawl for pushing the pressing plate to rotate and separate from the ratchet wheel.

4. The safety tensioning device of claim 1, wherein the base has a plurality of protrusions on the top of the base to separate the tensioning region, working region and release region, the tensioning region, the working region and the release region are distributed sequentially from front to rear of the base.

5. The safety tensioning device of claim 1, wherein when the limiting block of the driving pawl is restricted to the release region, both the driving pawl and the stop plate are separated from the ratchet wheel, the pressing plate is attached to the ratchet wheel, and, a moment M3 produced by the pressing plate on the reel is greater than the moment M2 produced by the coil spring on the main shaft, so as to prevent the reel from rotating freely.

6. The safety tensioning device of claim 1, wherein a housing covers the front end of the base, a notch and a barb which can be buckled with each other are arranged on the housing and the base, respectively, and, the housing has a groove for receiving the hook of the first bundling strap in a front side of the housing.

7. The safety tensioning device of claim 1, wherein the base has a connecting hole.

8. The safety tensioning device of claim 1, wherein a hand wheel assembly capable of manually winding the first bundling strap is connected to the main shaft opposite the coil spring, and the hand wheel assembly comprises a hand wheel capable of driving the main shaft to rotate.

9. The safety tensioning device of claim 8, wherein the hand wheel assembly further comprises a damping elastic member which can reduce rotational speed of the main shaft.

10. The safety tensioning device of claim 8, wherein the hand wheel is a disc-shaped hand wheel or an impeller-shaped hand wheel, when the hand wheel is an impeller-shaped hand wheel, a hand wheel box connected to the base is disposed on a periphery of the hand wheel.

11. The safety tensioning device of claim 1, wherein when the limiting block of the driving pawl is restricted in the tensioning region, both the driving pawl and the stop plate are engaged with the ratchet wheel.

* * * * *